United States Patent
Froger et al.

(12)

(10) Patent No.: US 6,185,515 B1
(45) Date of Patent: Feb. 6, 2001

(54) METHOD AND DEVICE FOR DETECTING A FILLING THRESHOLD FOR AN ELECTRICALLY INSULATING RESERVOIR CONTAINING AN ELECTRICALLY CONDUCTIVE PRODUCT, FOR EXAMPLE A PRINTING INK

(75) Inventors: Marie-Hélène Froger, Chateaugiron; Pascal Coudray, La Chapelle des Fougeretz; Mickaël Lorgeoux, Rennes, all of (FR)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/104,265

(22) Filed: Jun. 25, 1998

(30) Foreign Application Priority Data

Jun. 27, 1997 (FR) .................................................. 97 08130

(51) Int. Cl.⁷ ................................ G01F 23/26; B41J 2/05
(52) U.S. Cl. .......................... 702/199; 702/189; 702/190; 347/7; 347/14
(58) Field of Search .................................. 347/7, 14, 19; 702/199, 189, 190, 191; 455/296; 375/139, 232, 346

(56) References Cited

U.S. PATENT DOCUMENTS

| 4,255,791 | 3/1981 | Martin | 364/514 |
|---|---|---|---|
| 4,853,718 | 8/1989 | ElHatem et al. | 346/140 R |
| 6,022,090 | * 2/2000 | Coudray et al. | 347/7 |

FOREIGN PATENT DOCUMENTS

| 0856724 | * 1/1998 | (EP) | G01F/23/26 |
|---|---|---|---|
| 0783968 | * 5/1998 | (EP) | B41J/2/05 |
| 0856725 | * 5/1998 | (EP) | G01F/23/26 |
| 90/13797 | 11/1990 | (WO) . | |
| WO 97 27061 | * 7/1997 | (WO) | B41J/2/175 |

* cited by examiner

*Primary Examiner*—Kamini Shah
(74) *Attorney, Agent, or Firm*—Fitzpatrick, Cella, Harper & Scinto

(57) ABSTRACT

The object of the invention is the detection of a given threshold (optionally zero) for filling, with an electrically conductive product, a reservoir made of electrically insulating material having a storage cavity connected to an outlet channel. An excitation signal is applied to the cavity, in periodic square waves, and a measurement signal is taken off, one characteristic of which varies substantially with the quantity of product contained in the cavity reaches the filling threshold. From this characteristic, by comparison with a reference threshold, a binary signal C,C' is derived, which is filtered digitally whilst multiplying it (convolution product) by a signal which is identical to it, but with a delay equal to a multiple, at least equal to one, of the period of the square waves.

36 Claims, 8 Drawing Sheets

METHOD AND DEVICE FOR DETECTING A FILLING THRESHOLD FOR AN ELECTRICALLY INSULATING RESERVOIR CONTAINING AN ELECTRICALLY CONDUCTIVE PRODUCT, FOR EXAMPLE A PRINTING INK

The invention concerns the detection of a threshold for filling, with an electrically conducted product, a reservoir made of electrically insulating material. It relates notably, but not exclusively, to the detection of a threshold for filling, with a marking product, a reservoir designed to be integrated into an image formation device, for example for an ink in a printing apparatus. The filling threshold can be zero, corresponding to the case of a reservoir which no longer contains any available product.

The main aim of detecting when a filling threshold has been crossed is to be able to inform the user of the appliance including the reservoir that it will shortly be time to replace the reservoir.

Such detection is notably useful in printing appliances: this is then normally referred to as ink level detection.

Various methods of detecting an ink level in devices using inkjet technology are already known.

In particular the document EP-A2-0 028 399 describes a method of detecting a minimum level of ink in a reservoir which uses a resonating resonant circuit whose capacitance is formed by two metal plates between which the ink reservoir is situated. This ink behaves like a dielectric whose value changes as the ink level decreases; likewise the capacitance of the resonant circuit changes with this ink level. This resonant circuit is calibrated so that its resonant frequency, and therefore the maximum level of the voltage at its resistor, is achieved when the ink level has dropped to a predetermined minimum level, for example 20%. When it is detected that this threshold has been crossed, a visual or audible signal is emitted.

The detection of a given ink threshold appears to correspond to the detection of the crossing of a voltage threshold for the frequency which has previously been defined as being the resonant frequency for the residual quantity of ink which is to be detected.

In fact, it should be noted that, the lower the quantity of ink defining the capacitance, the lower the voltage peak, as a consequence of which this voltage peak is all the more difficult to detect when it corresponds to a small residual quantity of ink in the reservoir. This is no doubt one of the reasons which explains why this document provides for a minimum threshold as high as 20%.

In addition, the crossing of the voltage threshold by the electrical signal which is detected appeared to correspond to fairly scattered values of the residual quantity of ink actually available in the reservoir. This is no doubt another reason why the manufacturers of the printing equipment choose substantial safety margins in their indications of a "zero" residual ink level, supposed to cause the user to replace the reservoir.

One consequence of the choice of such a high safety margin is that, in order to guarantee that the user will not be prematurely short of ink, the reservoir is scrapped when there sometimes still remains a not insignificant quantity of usable ink.

The same situation prevails more generally with regard to reservoirs containing a marking product, whether or not it is a case of ink, and more generally with regard to reservoirs made of electrically insulating material containing an electrically conductive product, which can therefore be integrated into a capacitive arrangement.

One reason for the aforementioned scatter lies certainly in the existence of noise which is added to the measuring signal. Such noise is notably to be feared in the presence of significant sources of electromagnetic waves situated close to the reservoir, or when requirements for installation or mechanical configuration do not make it possible to place the plates sufficiently close to the reservoir, which reinforces the sensitivity of the measurements vis-a-vis the environment.

The object of the invention is to mitigate the aforementioned drawbacks by affording an improved accuracy of the time when the residual quantity of an electrically conductive product contained in an electrically insulating reservoir crosses a minimum threshold, with the consequence of allowing, in complete safety for the user, a lowering of this threshold and therefore a more complete utilisation of the product contained in the reservoir before scrapping the latter. The invention aims to achieve this object without any modification of the reservoir being necessary (such a modification is of course possible whilst remaining within the scope of the invention). The invention also aims to determine the absence of product in the outlet channel of the reservoir (zero filling threshold), notably the absence of ink in a duct connected to a print head, whilst doing away with ambient noise.

More particularly the invention aims to reduce noise liable to impair the accuracy of the measurements, in a simple and reliable fashion, but without giving rise to appreciable cost. It aims in fact to be able to achieve the aforementioned objects in the context of mass production.

The invention relates to this end to a method of detecting a predetermined threshold for filling, with an electrically conductive product, a reservoir made of electrically insulating material having a storage cavity containing this product connected to a product outlet channel, according to which the storage cavity is disposed in a capacitive arrangement;

a measuring procedure is defined having an excitation step consisting of applying, in periodic square waves, an electrical excitation signal to this capacitive arrangement and a capture step consisting of taking off a measurement signal from this capacitive arrangement, this electrical excitation signal being chosen so that this measurement signal has a characteristic varying substantially when the quantity of product contained in this cavity reaches this filling threshold;

a conversion procedure is defined, including steps consisting of identifying an instantaneous value (for example a peak to peak amplitude) of a quantity representing the said characteristic, comparing it with a reference threshold representing the filling threshold, and deriving therefrom a first binary signal representing the situation of the said instantaneous value with respect to the reference threshold;

a digital filtering procedure is defined, including a convolution step consisting of generating a third binary signal whilst effecting the convolution product of this first binary signal and a second binary signal derived from the first binary signal by introducing a delay equal to a multiple of at least one of the period of the square waves;

a processing procedure is defined including a test step consisting of deriving from the mean value of this third binary signal a binary value representing the situation of the quantity of product with respect to the filling threshold; and at least one measuring cycle is effected, including steps consisting of monitoring the measuring procedure, the conversion procedure, the filtering procedure and the processing procedure and capturing the said binary value.

It should be noted here that the measurement signal must normally be zero outside the square waves, that is to say when there is no excitation signal; when the measurement signal is not zero this may be due to noise, but an effective way of eliminating the noise is to seek the part of the measurement signal which is periodic with a period equal to that of the excitation square waves and to eliminate the remainder of the signal. It is this result that the convolution product makes it possible to produce very simply. The most simple delay is a delay equal to the period of the square waves, but it is of course possible to choose longer delays, for example in order to eliminate the periodic noises of short duration.

In so far, however, as this digital filtering does not make it possible to eliminate any part of the noise which has a frequency of occurrence substantially equal to the frequency of the square waves, it may be advantageous to combine this digital filtering with a filtering of another nature, for example a frequency filtering, so as also to exclude the noise being repeated at the frequency of the square waves and having a different frequency from that of the excitation signal.

Preferably, this frequency filtering is carried out with a passband filter (or with an equivalent system) whose band is centred on the excitation frequency; its width is advantageously equal to twice the frequency of the square waves, which has the advantage of allowing only the frequencies of the signal generated to pass.

Preferably, the capacitive arrangement is formed by disposing the said storage cavity between two electrically conductive plates, the excitation step consisting of applying the excitation signal to one of these plates, and the capture step consisting of taking the output signal from the other one of these plates. Advantageously, the other end of the outlet channel is connected to a predetermined potential, which can simply be that of earth: this ensures a certain degree of stability for the measuring signal, and in particular makes it possible to detect an absence of product in the outlet channel (it should be noted here that it is already conventional for a print head to be connected to earth, for reasons independent of any detection of ink level).

Preferably, in particular when the filling threshold in question is zero, the excitation signal is an electrical signal having a frequency which the said characteristic of the measurement signal is substantially independent of the value of the quantity of product, provided that this is greater than the filling threshold (for example provided that there is ink in the outlet channel). This has the advantage of allowing a clear detection of the (zero) filling threshold. This is notably the case when the product contained in the outlet channel is no longer capable of ensuring connection with earth.

A particularly simple choice for the said characteristic of the measuring signal which varies with the quantity of product contained in the cavity is the amplitude of the voltage.

As is known, square waves are defined by their period, but also by their cycle ratio, that is to say a ratio defining the duration of a square wave with respect to the period. So as to ensure an effective filtering it appears advisable for the duration of the square waves to be at most equal to half their period, or even at most equal to one third of their period.

So that the square waves are defined when the excitation signal is an alternating signal, it appears preferable for the frequency of the square waves to be at least around 100 times less than the frequency of the excitation signal.

One particularly effective and simple way of conducting the test step is to compare the mean value of the third binary signal during a reference duration with a predetermined threshold. So this mean is significant, it appears that this duration should be equal to at least around 10 times the period of the square waves.

The method applies particularly to cases where the product is a marking product, and the reservoir is designed to be integrated into an image formation device: the frequency of the electrical excitation signal is then preferably around 10 kilohertz. When the product is a printing ink and the reservoir is designed to be integrated into a printing device, the frequency of the electrical excitation signal is then preferably around 10 kHz.

For implementing the method, the invention also proposes a device for detecting a predetermined threshold for filling, with an electrically conductive product, a reservoir made of an electrically insulating material having a storage cavity containing this product, connected to a product outlet channel, having:

means designed to form, with the said storage cavity, a capacitive arrangement;

excitation means for applying, by periodic square waves, an electrical excitation signal to this capacitive arrangement and capture means for taking off a measurement signal from this capacitive arrangement, this electrical excitation signal being chosen so that this measurement signal has a characteristic varying substantially when the quantity of product contained in this cavity reaches this filling threshold;

conversion means designed so as to identify an instantaneous value of a quantity representing the said characteristic, to compare it with a reference threshold representing the filling threshold, and to derive therefrom a first binary signal representing the situation of the said instantaneous value with respect to the reference threshold;

digital filtering means designed so as to generate a third binary signal by producing the convolution product of this first binary signal and a second binary signal derived from the first binary signal by introducing a delay equal to a multiple at least equal to the period of the square waves;

processing means designed so as to derive, from the mean value of this third binary signal, a binary value representing the situation of the quantity of product with respect to the filling threshold.

Preferably this device has means for also implementing the preferred provisions mentioned above with regard to the method.

The invention also concerns a product supply device having a reservoir made from electrically insulating material having a storage cavity containing an electrically conductive product and a filling threshold detection device of the aforementioned type. It is preferably a case of an image formation device, such as in particular a printing device.

The invention also covers a logic processing unit designed to form part of a filling threshold detection device of the aforementioned type.

Objects, characteristics and advantages of the invention will emerge from the following description, given by way of non-limitative illustrative example with regard to the accompanying drawings in which.

Figure 1:
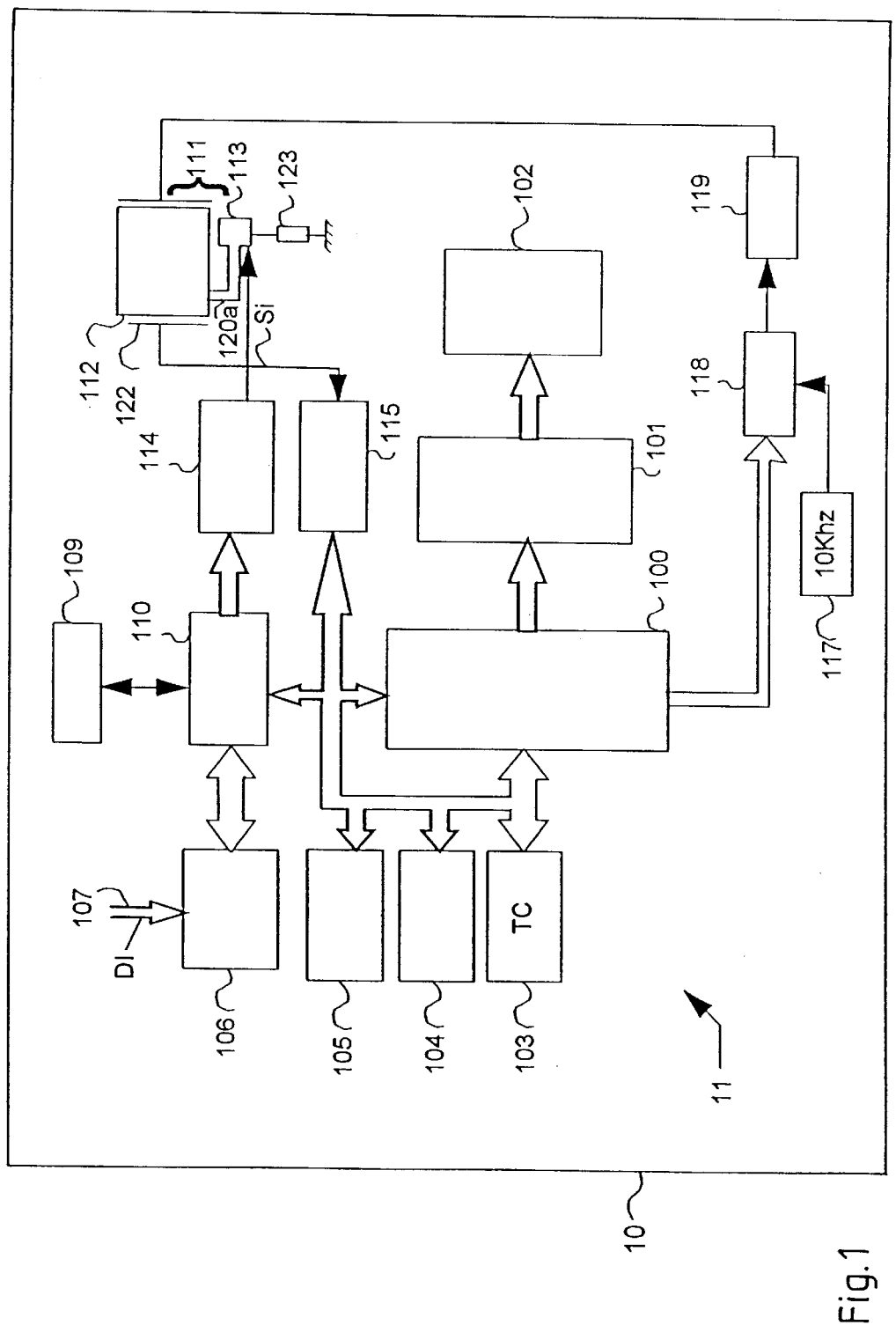
FIG. 1 is a block diagram of a printing device according to the invention.

In general terms, the invention uses a capacitive arrangement by utilising two metal plates on each side of a cartridge or reservoir made of plastic (and therefore electrically insulating) containing a conductive ink, the whole a forming a capacitor, and preferably using the duct connecting the reservoir to the print head as an electrical switch between the said reservoir and the equivalent impedance between the said print head and earth.

The invention is here described with regard to an image transfer 11, for example included in a printer 10, which receives data to be printed DI by means of a parallel input/output port 107 connected to an interface circuit 106. The circuit 106 is connected to an ink ejection control circuit 110 which controls an ink cartridge 111, via an amplification circuit 114.

The ink cartridge 111 is exchangeable and is mounted on a reciprocating carriage actuated by a motor 102.

The ink cartridge comprises essentially an ink reservoir 112, a duct 120 connecting the reservoir and the print head 113. This print head 113 creates an impedance between the ink and earth.

The printer also has a main data processing circuit 110, associated with a read only memory 103 and a random access memory 109. The read only memory 103 contains the operating programs of the main processing circuit 100, whilst the random access memory 109, also associated with the ink ejection control circuit 110, temporarily stores the data DI received by means of the interface 106 as well as the data processed by the main processing circuit 100. This random access memory 106 serves to store the measurement samples necessary for the convolution product.

The main processing circuit 100 is connected to a display 104, on which the main processing circuit 100 controls the display of messages representing the operation of the printer. The main processing circuit 100 is connected to a keypad 105, having at least one switch, by means of which the user can transmit operating commands to the printer.

The processing circuit 100 is also connected to the motor 102 by means of an amplification circuit 101. The motor 102 ensures the movement of the carriage which carries the printing cartridge 111. The motor 102 is for example a stepping motor. The printer described previously is conventional and well known to persons skilled in the art. It will therefore not be detailed any further.

Thus, according to the invention, the printer has two metal plates 122 and 121 fixed outside the plastic reservoir containing the conductive ink, the whole producing a capacitor.

The printer comprises a means for supplying the metallic element 121 with an alternating signal supplied by an oscillator 117, via a switch 118 and an amplifier 119. This oscillator supplies a signal of moderate frequency, for example 10 kHz. It may be replaced with another oscillator (not shown) of high frequency, for example 5 MHz; as a variant these two oscillators can coexist.

The printer also comprises a means 115 for converting the electrical signal between the plate 122 and earth into a signal representing the crossing or otherwise of an ink threshold, or the presence or otherwise of ink in the connecting duct 120 (this case can correspond to a zero ink threshold). The presence or absence of ink in this duct connects or does not connect the ink contained in the reservoir to earth by means of the impedance existing between the ink in the print head and the said earth.

The main processing circuit 100 is connected to the switch 118 in order to control it and thus to enable the alternating signal to be transmitted between the oscillator 117 and the metal element 121 constituting one of the faces of the capacitor. This switch 118 controlled by the central unit serves to generate the signal of period τ as well as its cycle ratio.

The metal reception element 122 is connected to a conversion circuit 115, itself connected to the main processing circuit 100, this metallic element 122 constituting the second face of the capacitor with the dielectric cartridge.

The element 122 is connected to the conversion circuit 115, which in response supplies a digital signal SN to the main processing circuit 100.

Figure 2:
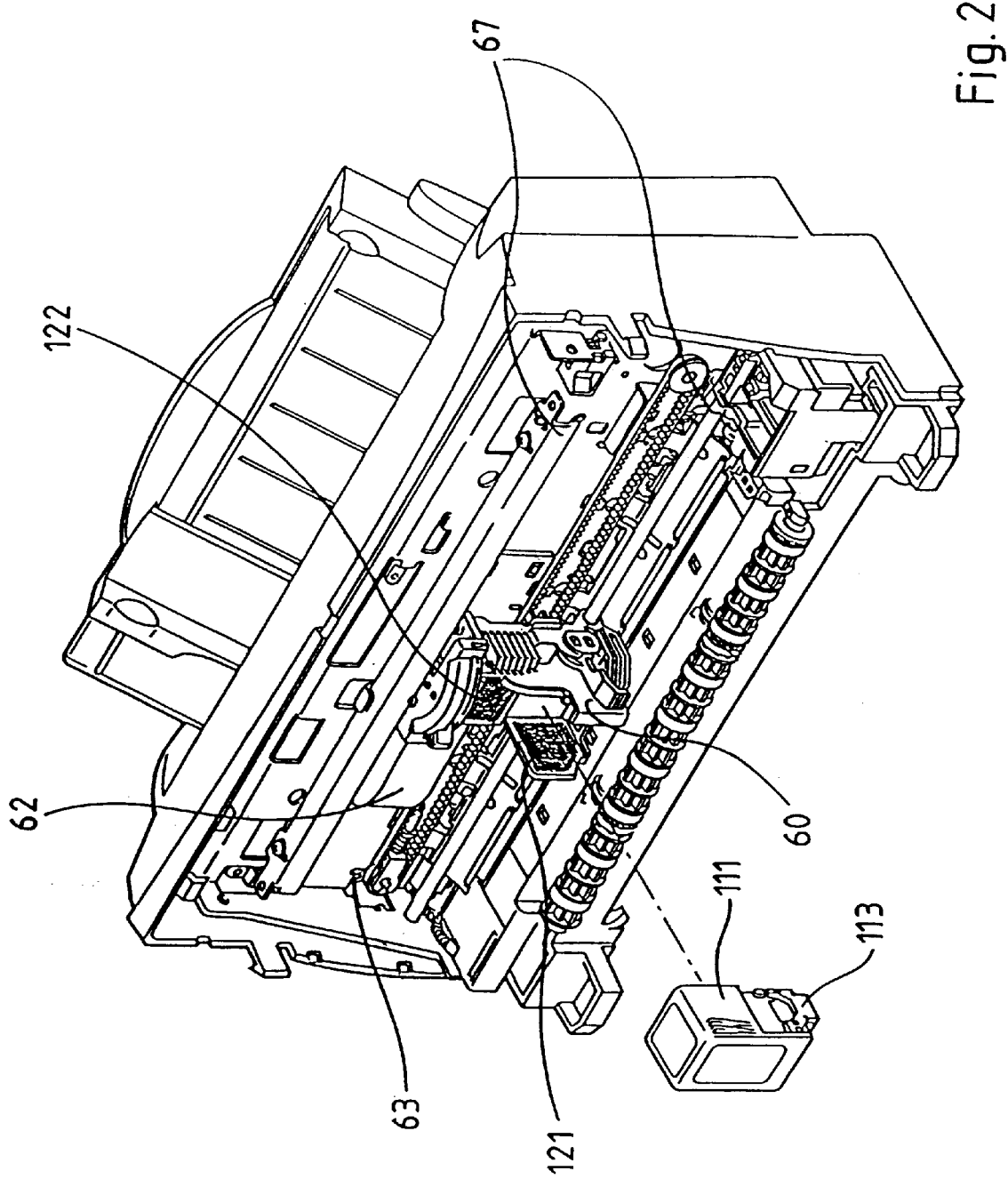
FIG. 2 is a simplified perspective view of this printing device.

The device comprises, in a conventional fashion, a carriage 60 (see FIG. 2) for carrying the print cartridge 111. This carriage is driven in a reciprocating movement on a movement path formed by guide rails 67. The motor drives the carriage 60 by means of a belt device 63.

The movement path of the print head 113 is parallel to a line on a printing medium, not shown, such as a sheet of paper. A flexible cable 62 connects the amplification circuit 114 to the cartridge 111, the amplifier 119 to the metallic element 121 and the metallic element 122 to the detection circuit 115.

Figure 3:
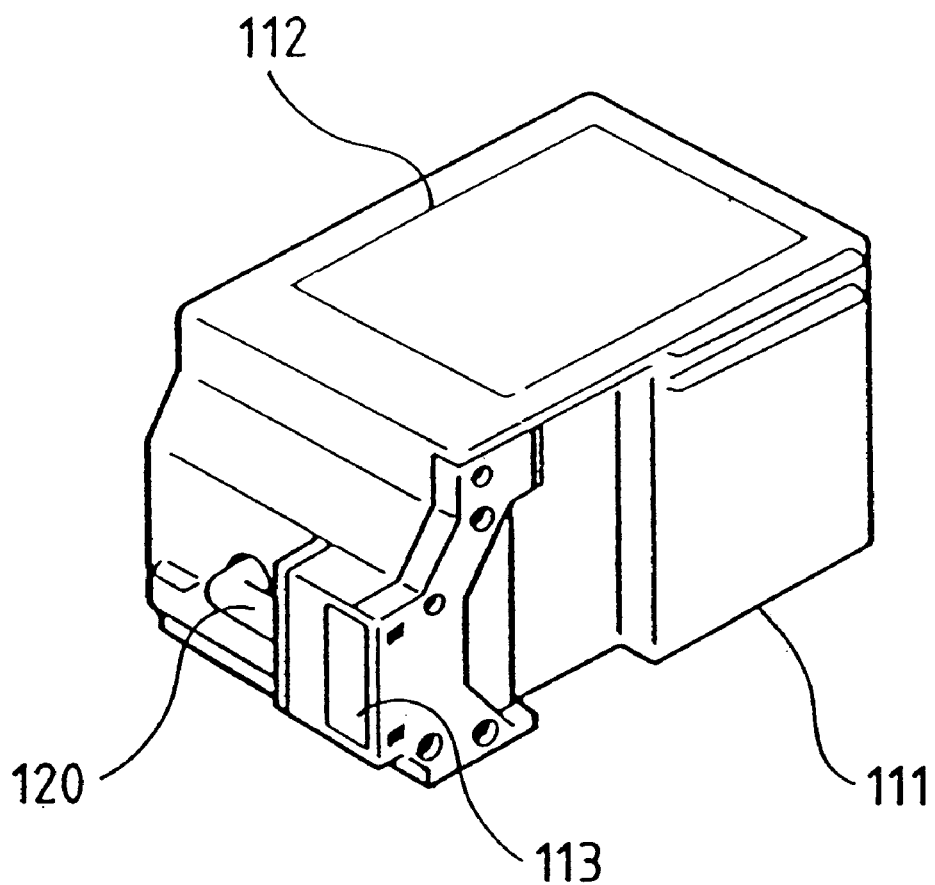
FIG. 3 is a perspective schematic view of a reservoir of this printing device.

FIG. 3 is a view of the ink cartridge 111. The reservoir part 112, the connecting duct 102 connecting the said reservoir to the print head and finally the print head 113 can be seen.

Figure 4:
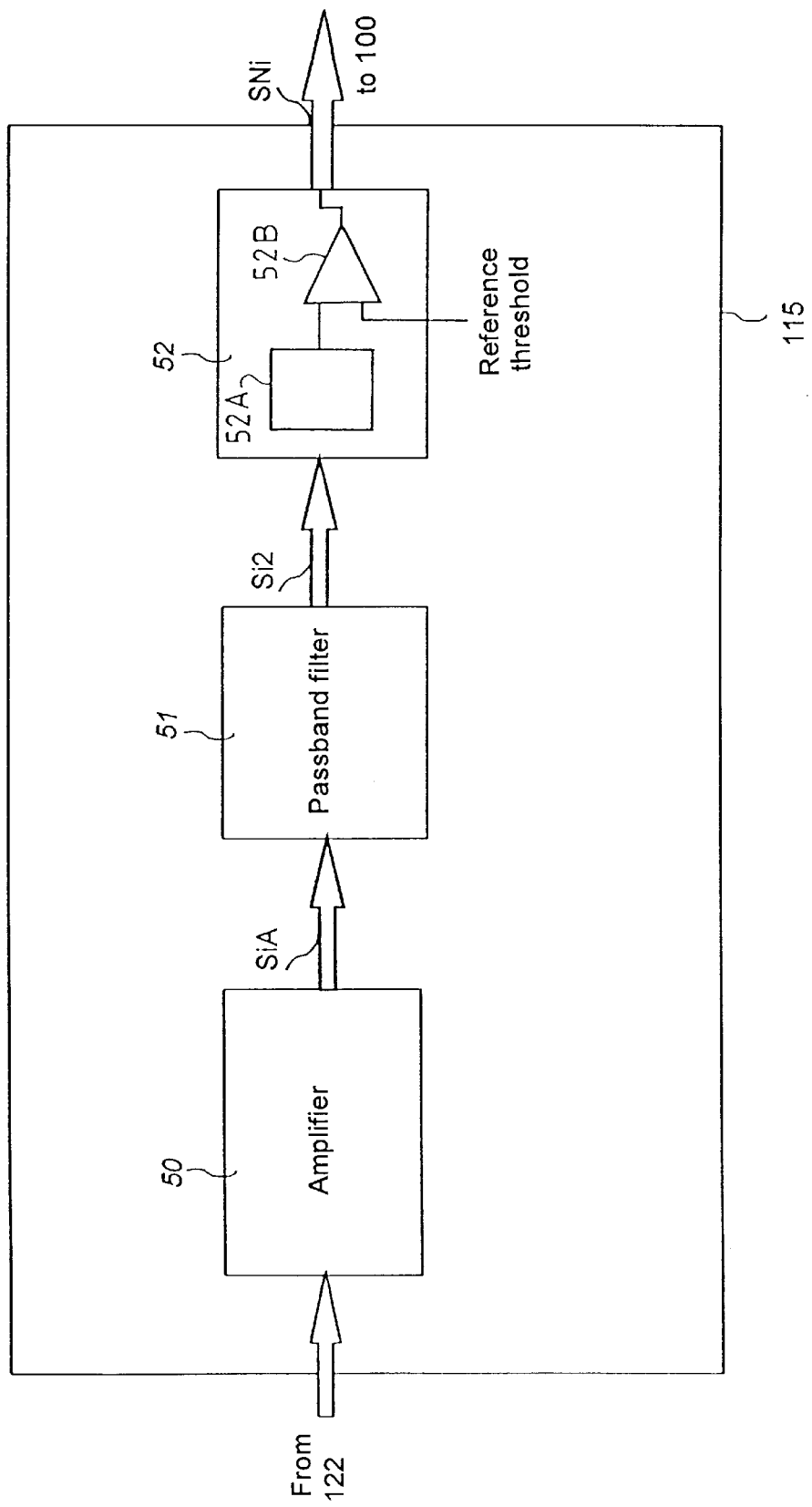
FIG. 4 is a block diagram of the conversion and filtering device of this printing device.

The conversion circuit 115 in FIG. 4 extracts the amplitude of the signal received by the metal plate 122 in response to the excitation signal SE. This conversion circuit 115 comprises an amplifier 50 with an input impedance of 1 MΩ connected to a passband filter 51 able to transmit signals whose frequency lies between f0−1/τ (f0 is the oscillator frequency) and f0+1/τ. The function of this filter is to filter all the signals whose frequency is outside this spectrum. The filter 51 is connected to a comparator 52 connected to the processing circuit 100. This comparator has an envelope detector 52A followed by a comparison element 52B delivering the binary signal SNi as a function of the position of the amplitude detected with respect to a reference threshold.

Figure 5:
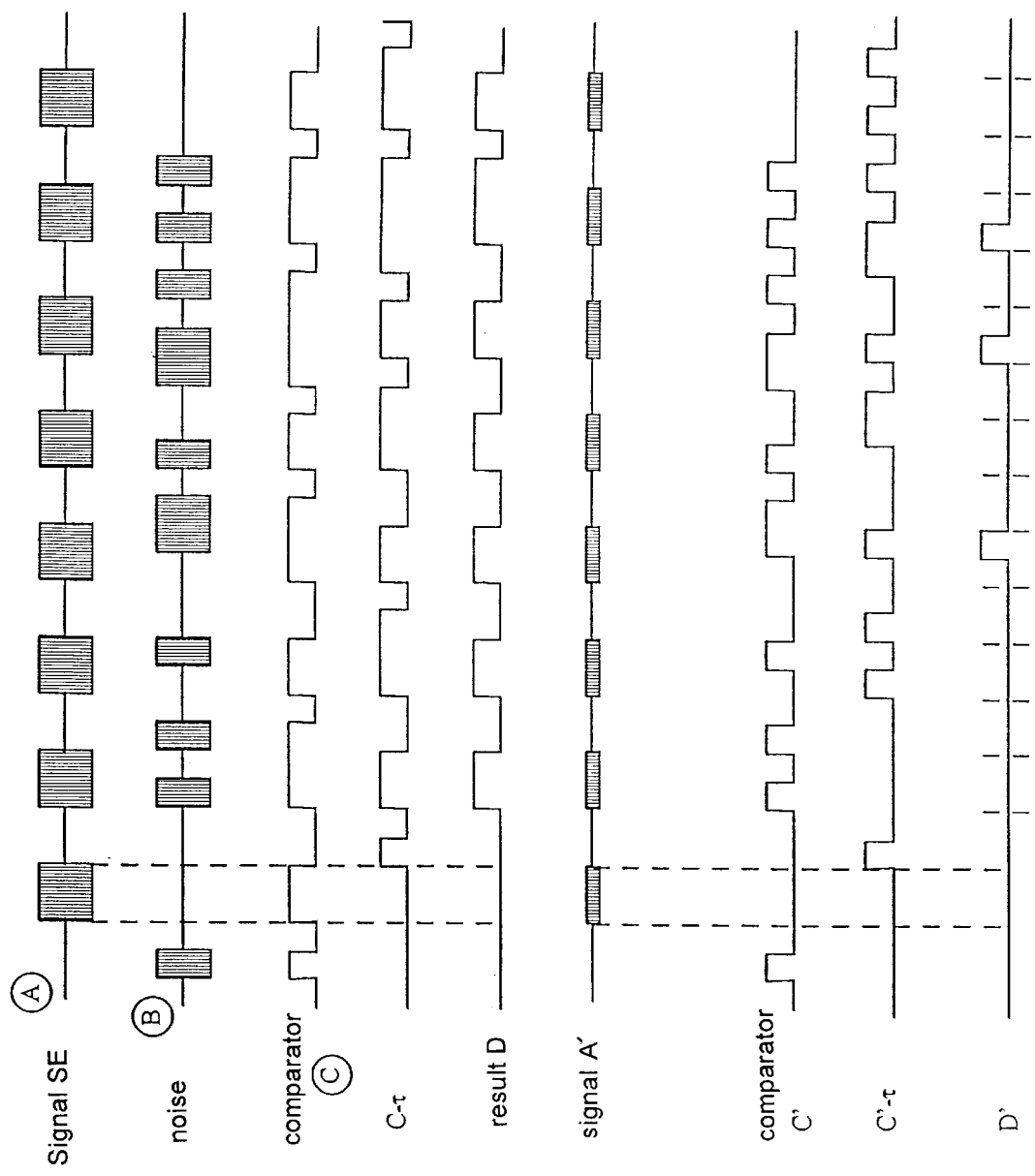
FIG. 5 is a timing diagram showing the change over time of various signals of the device of FIG. 4.

FIG. 5 shows the efficacy of the invention.

The curve A represents the signal received at the metal plate 122 and solely filtered by the filter 51, when there is no longer any ink in the duct 120.

The curve B represents the noise received by this same plate. The source of the noise being represented by the generator B in FIG. 5.

The curve C represents the output of the comparator, and the curve D is the result, after the convolution product. It is easy to find the periodic signal generated by the oscillator 117: this corresponds to the absence of ink.

The curve A' represents the signal received on the metal plate 122 and filtered by the filter 51 when the ink is present in the duct 120.

The curve C' represents the binary signal obtained at the output of the comparator 52B.

The curve D' represents the convolution product effected between τ and the signal previously received at time t−τ.

It is easy to see that the curve D' for most of the time remains at the low level, which corresponds to the presence of ink.

Figure 6:
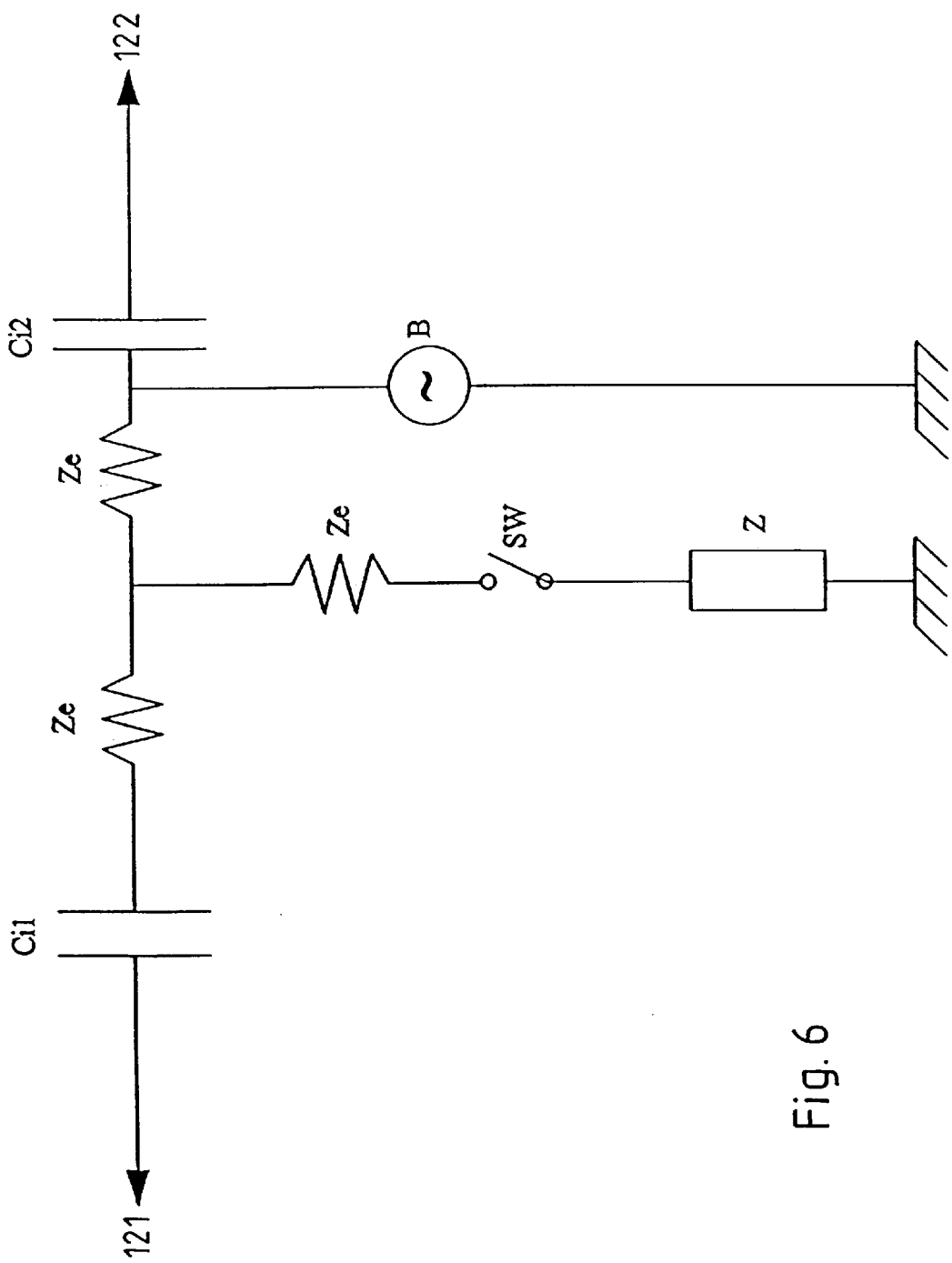
FIG. 6 is a diagram depicting the capacitive arrangement of which the cavity forms part.

FIG. 6 depicts the electrical diagram of the phenomenon where:

Ci1: represents the capacitor formed by the metal element 121, the wall of the reservoir 112 and the ink;

Ze: represents the equivalent impedance of the ink, which can be resistive and capacitive;

Ci2: represents the capacitance formed by the metal element 122, the wall of the reservoir 112 and the ink;

Sw: represents the ink present or absent in the duct 120. This is depicted in the form of a switch which is open or closed according to the absence or presence of ink;

Z: represents the impedance between the ink contained in the print head and the earth of the system. The oscillator is connected to the element 121 and, when the quantity of ink decreases, the capacitances Ci1 and Ci2 decrease, the impedance Ze increases substantially and the voltage at 122 decreases. When there is no ink in the duct, this serves as a switch, then causing an abrupt rise in the electrical signal on the element 122;

B: represents a source of pseudo-random noise coming either from the outside environment to the printer, or from the printer itself.

Figure 7:
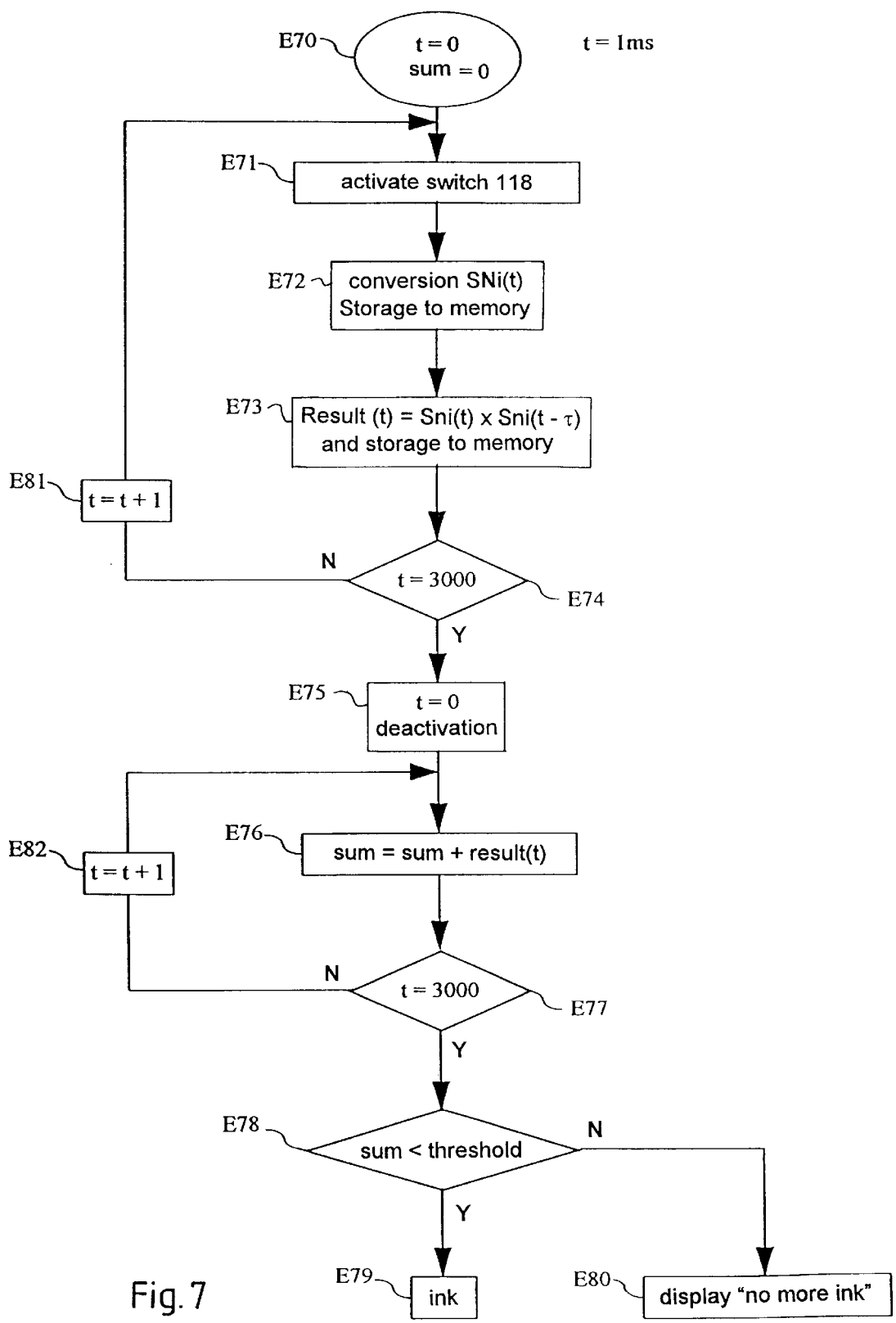
FIG. 7 is a flow diagram of the program resident in read only memory for implementing the invention.
Figure 8:
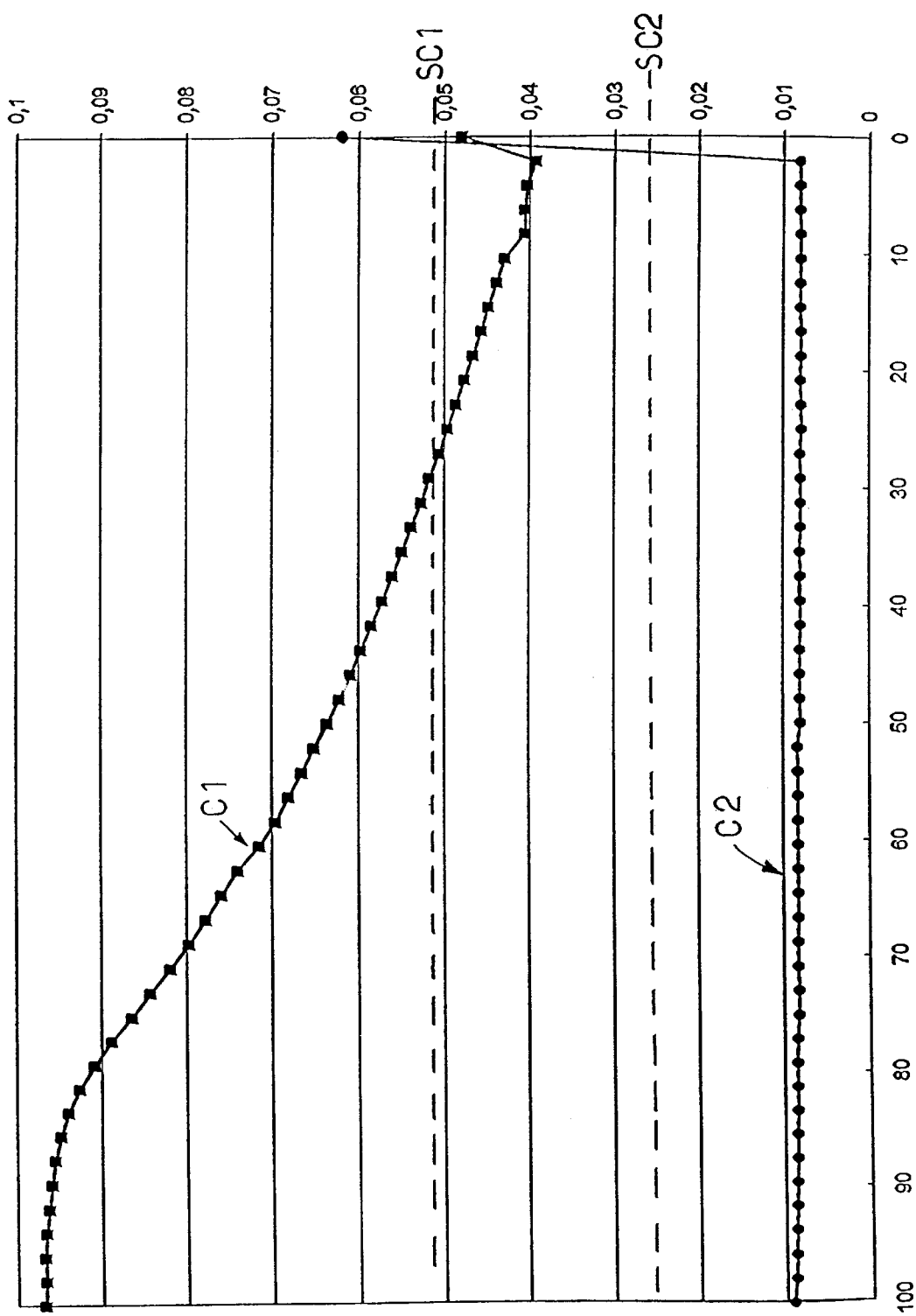
FIG. 8 is an example of a curve obtained for the change in the amplitude of the voltage of the measuring signal as a function of the residual proportion of ink.

FIG. 7 shows an algorithm of the invention based on the case of curve C2 in FIG. 8, as stored in the read only memory 103 of the printing device.

This curve C2 gives the correspondence between the amplitude of the voltage of the signal measured and the percentage of residual ink, for a frequency (here equal to 10 kHz) for which this amplitude depends only on the quality of the earthing provided by ink in the outlet channel.

The algorithm comprises 13 steps E70 to E82, which are run through periodically, for example during the printing of a document. The algorithm determines the presence of ink in the reservoir 112.

The step E70 consists, at the start of the test, of setting the variables t and sum to 0 and allocating the memory space in RAM 102 necessary for the storage of the data.

Step E71 consists of activating the switch 118 so as to produce a signal of period equal to τ and of predetermined cycle ratio. At E72, the signal received by the plate 122 is processed and then compared, and is transcribed into a binary information item Sni(t).

At E73, the convolution product is then effected. It consists of multiplying the bit contained in the memory area in Sni(t−τ) by the value in Sni(t) and storing the result. τ represents an index of the central unit periodically, every ms for example, reads the output of the comparator.

For example, when t=3000, the central unit has sufficient samples to effect a processing, and therefore leaves the loop towards E75. If not, t is incremented at E81 and the acquisition continues, and the central unit then switches to E71.

At E75, the switch 118 is deactivated and reset to 0.

Steps E76, E77 and E82 consist of counting the number of times where the result (t) is at level 1.

The number is then composed at E78 at a predetermined threshold.

Where the test is negative, that is to say sum≧threshold, the central unit interrupts the printing and alerts the user.

In the affirmative, this implies that there is ink, and printing can continue.

As indicated above, the curve C2 in FIG. 8 is substantially horizontal and rises abruptly beyond a threshold SC2 when there is no ink in the channel.

However, the invention also applies to the case of a curve such as C1, which corresponds to a sequence (here 5 MHz) for which the amplitude of the signal measured decreases continuously with the quantity of ink: The threshold SC1 to be monitored is then defined in arbitrary fashion according to the percentage of residual ink for which it is wished to send, for example, a warning message to the operator.

What is claimed is:

1. A method of detecting a predetermined threshold for filling, with an electrically conductive product a reservoir made of electrically insulating material having a storage cavity for containing the product and having an outlet channel for the product in which the storage cavity is disposed in a capacitive arrangement, said method comprising:

defining a measuring procedure having an excitation step of applying, in periodic square waves, an electrical excitation signal to the capacitive arrangement and a capture step of taking a measurement signal from the capacitive arrangement, the electrical excitation signal being chosen so that the measurement signal has a characteristic varying substantially when the quantity of product contained in the storage cavity reaches the predetermined filling threshold;

defining a conversion procedure including steps of identifying an instantaneous value of a quantity representing the characteristic, comparing the instantaneous value with a reference threshold representing the predetermined filling threshold, and deriving therefrom a first binary signal representing the situation of the instantaneous value with respect to the reference threshold;

defining a digital filtering procedure including a convolution step of generating a third binary signal whilst effecting convolution product of the first binary signal and a second binary signal derived from the first binary signal by introducing a delay equal to a multiple at least equal to one times the period of the square waves;

defining a processing procedure including a test step of deriving from the mean value of the third binary signal a binary value representing the situation of the quantity of product with respect to the predetermined filling threshold; and effecting at least one measuring cycle including steps of monitoring the measuring procedure, the conversion procedure, the filtering procedure and the processing procedure, and of capturing the binary value.

2. A method according to claim 1, wherein the storage cavity is disposed between two electrically conductive plates forming part of the capacitive arrangement, the excitation step applies the excitation signal to one of said plates, and the capture step takes the output signal at the other one of said plates.

3. A method according to claim 2, wherein one end of the outlet channel is connected to a predetermined potential.

4. A method according to claim 3, wherein the predetermined potential is that of earth.

5. A method according to claim 1, wherein the excitation signal is an electrical signal having a frequency for which the characteristic of the measurement signal is substantially independent of the value of the quantity of product, provided that the latter is greater than the predetermined filling threshold.

6. A method according to claim 1, wherein the characteristic of the measurement signal which varies with the quantity of product contained in the cavity includes amplitude of the voltage.

7. A method according to claim 1, wherein the excitation signal has a given frequency and the conversion procedure includes a prior step of frequency filtering.

8. A method according to claim 7, wherein said filtering step includes use of a passband filter whose passband is centered on the frequency of the excitation signal with a width substantially equal to twice the frequency of the square waves.

9. A method according to claim 7, wherein duration of the square waves is at most equal to half their period.

10. A method according to claim 9, wherein duration of the square waves is at most equal to one third of their period.

11. A method according to claim 1, wherein the frequency of the square waves is at least around 100 times less than the frequency of the excitation signal.

12. A method according to claim 1, wherein the delay is equal to the period of the square waves.

13. A method according to claim 1, wherein the test step of the processing procedure includes comparing the mean value of the third binary signal during a reference period to a predetermined threshold.

14. A method according to claim 13, wherein the reference period is equal to at least ten times the period of the square waves.

15. A method according to claim 1, wherein the product is a marking product, the reservoir is designed to be integrated into an image formation device, and the frequency of the electrical excitation signal is around 10 kilohertz.

16. A method according to claim 15, wherein the product is a printing ink and the reservoir is designed to be integrated into a printing device.

17. A device for detecting a predetermined threshold for filling, with an electrically conductive product, a reservoir made of an electrically insulating material having a storage cavity for containing the product and having a product outlet channel, said device including:

means to form, with the storage cavity, a capacitive arrangement;

excitation means for applying, by periodic square waves, an electrical excitation signal to the capacitive arrangement and capture means for taking a measurement signal from the capacitive arrangement, the electrical excitation signal being chosen so that the measurement signal has a characteristic varying substantially when the quantity of product contained in the storage cavity reaches the predetermined filling threshold;

conversion means to identify an instantaneous value of a quantity representing the characteristic, to compare the instantaneous value with a reference threshold representing the predetermined filling threshold, and to derive therefrom a first binary signal representing the situation of the instantaneous value with respect to the reference threshold;

digital filtering means to generate third binary signal by producing the convolution product of the first binary signal and a second binary signal derived from the first binary signal by introducing a delay equal to a multiple at least equal to one times the period of the square waves; and a processing means to derive, from the mean value of the third binary signal, a binary value representing the situation of the quantity of product with respect to the predetermined filling threshold.

18. A device according to claim 17, wherein the capacitive arrangement includes two electrically conductive plates defining a location designed to receive the storage cavity of the reservoir, one of said plates being connected to the excitation means and the other of said plates being connected to the measurement means.

19. A device according to claim 18, wherein the capacitive arrangement also includes means for connecting one end of the outlet channel to a predetermined potential.

20. A device according to claim 19, wherein the predetermined potential is that of earth.

21. A device according to claim 17, wherein the excitation means operates such that the excitation signal has a frequency for which the characteristic of the measurement signal is substantially independent of the value of the quantity of product, provided that the latter is greater than the predetermined filling threshold.

22. A device according to claim 17, wherein said conversion means detects the amplitude of the voltage of the measurement signal.

23. A device according to claim 17, wherein the excitation means includes oscillator means having a given frequency and the conversion means includes frequency filtering means.

24. A device according to claim 23, wherein said frequency filtering means includes a passband filter whose passband is centered on the frequency of the excitation signal with a width substantially equal to twice the frequency of the square waves.

25. A device according to claim 17, wherein the excitation means operates such that duration of the square waves is at most equal to half their period.

26. A device according to claim 25, wherein duration of the square waves is at most equal to one third of their period.

27. A device according to claim 17, wherein the frequency of the square waves is at least around 100 times the frequency of the excitation signal.

28. A device according to claim 17, wherein the delay is equal to the period of the square waves.

29. A device according to claim 17, wherein the processing means includes means for comparing the mean value of the third binary signal during a reference period with a predetermined threshold.

30. A device according to claim 29, wherein the reference period is equal to at least around ten times the period of the square waves.

31. A device according to claim 17, wherein the product is a marking product, the reservoir is designed to be integrated into an image formation device, and the frequency of the electrical excitation signal is around 10 kilohertz.

32. A device according to claim 31, wherein the product is a printing ink and the reservoir is designed to be integrated into a printing device.

33. A product supply device having a reservoir made of electrically insulating material having a storage capacity containing an electrically conductive product and a threshold detection device according to claim 17.

34. An image formation device having a reservoir made of electrically insulating material having a storage cavity containing an electrically conductive marking product and a threshold detection device according to claim 17.

35. A printing device having an electrically insulating reservoir having a storage cavity containing an electrically conductive ink and a consumption monitoring device according to claim 17.

36. Office equipment including a printing device according to claim 35.

* * * * *